United States Patent
Amma et al.

(10) Patent No.: US 12,236,667 B2
(45) Date of Patent: Feb. 25, 2025

(54) LEARNING METHOD AND PROCESSING APPARATUS REGARDING MACHINE LEARNING MODEL CLASSIFYING INPUT IMAGE

(71) Applicants: TOYOTA JIDOSHA KABUSHIKI KAISHA, Toyota (JP); The University of Tokyo, Tokyo (JP)

(72) Inventors: Ayako Amma, Tokyo-to (JP); Kai Katsumata, Tokyo-to (JP); Hideki Nakayama, Tokyo-to (JP); Ikki Kishida, Tokyo-to (JP)

(73) Assignees: TOYOTA JIDOSHA KABUSHIKI KAISHA, Toyota (JP); THE UNIVERSITY OF TOKYO, Tokyo (JP)

( * ) Notice: Subject to any disclaimer, the term of this patent is extended or adjusted under 35 U.S.C. 154(b) by 335 days.

(21) Appl. No.: 17/821,909

(22) Filed: Aug. 24, 2022

(65) Prior Publication Data
US 2023/0062289 A1   Mar. 2, 2023

(30) Foreign Application Priority Data
Aug. 26, 2021 (JP) ................. 2021-138368

(51) Int. Cl.
*G06K 9/00* (2022.01)
*G06V 10/764* (2022.01)
(52) U.S. Cl.
CPC ................. *G06V 10/764* (2022.01)
(58) Field of Classification Search
None
See application file for complete search history.

(56) References Cited

U.S. PATENT DOCUMENTS

| 8,170,280 B2 * | 5/2012 | Zhao | G06V 10/772 |
| | | | 382/103 |
| 8,873,868 B2 * | 10/2014 | Nakano | G06F 18/24 |
| | | | 704/251 |

(Continued)

FOREIGN PATENT DOCUMENTS

| JP | 2019083002 A | 5/2019 |
| JP | 2019091443 A | 6/2019 |
| JP | 2020004406 A | 1/2020 |

OTHER PUBLICATIONS

Miller et al., "Class anchor clustering: a loss for distance-based open set recognition" (Year: 2021).*

(Continued)

*Primary Examiner* — SJ Park
(74) *Attorney, Agent, or Firm* — Dickinson Wright, PLLC

(57) ABSTRACT

A method by one or more computers for learning a machine learning model classifying an input image into known classes and an unknown class by extracting a feature of the input image. The method comprises acquiring a set of features of a plurality of samples of training data each of which is with a label, calculating a loss function based on the set of the features, and learning the machine learning model to reduce the loss function. The loss function is calculated to include a first loss function and a second loss function. The first loss function is configured to become larger as first distances become smaller than a predetermined margin. The second loss function is configured to become larger as second distances become larger and as third distances become smaller.

8 Claims, 10 Drawing Sheets

Without decoupling loss (first loss function)

With decoupling loss (first loss function)

○ △ □ : features for samples of known classes
▽ ◇ ✚ : features for samples of unknown class (56) References Cited

U.S. PATENT DOCUMENTS

| | | | |
|---|---|---|---|
| 12,093,306 B2* | 9/2024 | Cohen | G06F 16/535 |
| 2017/0270389 A1* | 9/2017 | Skaff | G06V 10/764 |
| 2019/0130231 A1 | 5/2019 | Liu et al. | |
| 2019/0147336 A1 | 5/2019 | Yu et al. | |
| 2019/0392260 A1 | 12/2019 | Pang et al. | |

OTHER PUBLICATIONS

Kai Katsumata et al. (Sep. 2021) "Open-Set Domain Generalization Via Metric Learning" 2021 IEEE International Conference on Image Processing (ICIP), pp. 459-463.

* cited by examiner

TRAINING DATA

INPUT IMAGE

Without decoupling loss (first loss function)

With decoupling loss (first loss function)

FIG. 4

MACHINE LEARNING MODEL
HAS BEEN LEARNED
TO REDUCE FIRST LOSS FUNCTION

|  | VLCS | | | | | DomainNet | | | | | | |
| --- | --- | --- | --- | --- | --- | --- | --- | --- | --- | --- | --- | --- |
|  | VOC | LabelMe | Caltech | Sun | Avg | Clipart | Infograph | Photo | Quickdraw | Real | Sketch | Avg |
| Deep All | 49.97 | 49.69 | 34.64 | 50.44 | 46.18 | 69.49 | 57.27 | 67.71 | 37.11 | 66.26 | 63.47 | 60.21 |
| w/ $L_{triplet}$ | 53.11 | 50.84 | 38.35 | 64.94 | 51.81 | 79.68 | 62.72 | 71.00 | 37.46 | 74.67 | 70.64 | 66.02 |
| w/ $L_{metric}$ | 56.50 | 53.18 | 34.79 | 61.44 | 51.47 | 79.25 | 63.65 | 71.00 | 38.26 | 75.24 | 72a.36 | 66.62 |
| JiGen | 52.37 | 49.62 | 32.94 | 62.67 | 49.40 | 67.39 | 57.22 | 62.80 | 36.61 | 65.27 | 61.71 | 58.50 |
| w/ $L_{triplet}$ | 51.01 | 50.27 | 35.24 | 65.34 | 50.46 | 76.99 | 61.91 | 68.05 | 38.23 | 62.37 | 70.64 | 63.03 |
| w/ $L_{metric}$ | 48.51 | 50.84 | 38.58 | 65.93 | 50.96 | 79.03 | 64.30 | 72.15 | 36.03 | 76.29 | 72.61 | 66.73 |
| MMLD | 46.11 | 49.08 | 32.94 | 60.36 | 47.12 | 71.55 | 58.93 | 68.45 | 35.71 | 67.97 | 67.02 | 61.60 |
| w/ $L_{triplet}$ | 46.58 | 50.50 | 34.87 | 60.58 | 48.13 | 79.15 | 62.05 | 72.03 | 35.70 | 65.93 | 71.96 | 64.47 |
| w/ $L_{metric}$ | 49.15 | 51.42 | 36.57 | 67.90 | 51.26 | 81.31 | 63.65 | 73.94 | 36.67 | 75.00 | 73.68 | 67.37 |

LEARNING METHOD AND PROCESSING APPARATUS REGARDING MACHINE LEARNING MODEL CLASSIFYING INPUT IMAGE

CROSS-REFERENCE TO RELATED APPLICATION

The present disclosure claims priority under 35 U.S.C. § 119 to Japanese Patent Application No. 2021-138368, filed on Aug. 26, 2021, which is incorporated herein by reference in its entirety.

BACKGROUND

Technical Field

The present disclosure relates to a technique for classifying an input image based on a feature of the input image.

Background Art

It is known that in machine learning, performance of learning models degrades when the domains of data points in training and testing (source domain and target domain) are different. Domain generalization (DG) is a technique to maintain the performance in unseen domains that are not used for training. Since many machine learning applications are required to achieve good performance in new environments, DG gains considerable attention among researchers over recent years. For example, Patent Literature 1 is cited as a conventional technique related to machine learning.

LIST OF RELATED ART

Patent Literature 1: Japanese Laid-Open Patent Application Publication No. JP-2019-091143 A

SUMMARY

The conventional DG (closed-set DG) requires that all classes in the target domain should appear in the source domain. This requirement lacks practicality because the real-world applications such as autonomous vehicles must distinguish unknown classes which are not shown in the training phase. To overcome such impracticality, the inventors of the present disclosure bring the notion of open set in the DG problem and define this problem as the problem of open-set domain generalization (OSDG). Unlike DG, some classes of no interest are given as an unknown class in OSDG, where it is required to distinguish the unknown class from known classes (classes of interest) and generalize on unseen domains, simultaneously.

The standard DG approaches are to align the data distribution of multiple known domains in a representation space. However, this strategy is not simply applicable to OSDG problems since the alignment of data distribution is hard to be done with the existence of the unknown class.

The present disclosure has been made in view of the above problem, and it is an object of the present disclosure to provide techniques which can effectively solve OSDG with respect to a technique for classifying an input image based on a feature of the input image.

A first disclosure is directed to a method performed by one or more computers for learning model classifying an input image into known classes and an unknown class by extracting a feature of the input image, each of the known classes showing that the input image falls into any one of specific categories and the unknown class showing that the input image does not fall into any of the specific categories.

The method according to the first disclosure comprises:
acquiring a set of features by inputting a plurality of samples of training data into the machine learning model, each of the plurality of samples of training data being with a label;
calculating a loss function based on the set of features; and
learning the machine learning model to reduce the loss function, wherein
the loss function is configured to include:
a first loss function configured to become larger as first distances become smaller than a predetermined margin, wherein the first distances are distances in a feature space between features of a plurality of first anchor points selected out of the plurality of samples of training data with the label corresponding to the unknown class and features of one or more of samples of training data; and
a second loss function configured to become larger as second distances become larger and as third distances become smaller, wherein
the second distances are distances in the feature space between features of a plurality of second anchor points selected out of the plurality of samples of training data with the label corresponding to any one of the known classes and features of one or more of samples of training data with a same label as the plurality of second anchor points, and
the third distances are distances in the feature space between the features of the plurality of second anchor points and features of one or more of samples of training data with a different label as the plurality of second anchor points.

A second disclosure is directed to a method including the following features with respect to the method according to the first disclosure.

The first loss function is represented by the following formula:

$$Ld = \frac{1}{|N|} \sum_{(x_a, x_n) \in N} \max(0, -d(f(x_a), f(x_n)) + \alpha)$$

$$N = \{(x_a, x_{ni}) | y_a \in \{u\}, y_{ni} \in C \cup \{u\}, d(f(x_a), f(x_{ni})) < \alpha\},$$

$$i = \{1, 2, \ldots, K\}$$

where:
Ld is the first loss function, $x_a$ is a first anchor point, $x_{ni}$ are samples of training data selected with the number of K for the first anchor point, N is a set of combinations of the plurality of first anchor points and the samples of training data, $y_a$ is the label of $x_a$, $y_{ni}$ is the label of $x_{ni}$, C is the set of the known classes, u is the unknown class, $\alpha$ is the predetermined margin, d(a, b) is a function measuring a distance in the feature space between a and b, and f(x) is the feature of x.

A third disclosure is directed to a method including the following features with respect to the method according to the second disclosure.

the second loss function is a triplet loss configured to be that the plurality of second anchor points is implemented as the anchor of the triplet loss and that the margin of the triplet loss is the predetermined margin of the first loss function.

A fourth disclosure is directed to a processing apparatus.

The processing apparatus according to the fourth disclosure is configured to execute classifying an input image into known classes and an unknown class based on a feature of the input image by using a machine learning model, each of the known classes showing that the input image falls into any one of specific categories and the unknown class showing that the input image does not fall into any of the specific categories.

A fifth disclosure is directed to a processing apparatus including the following features with respect to the processing apparatus according to the fourth disclosure.

The machine learning model has been learned by a method comprising:
acquiring a set of output and a set of features by inputting a plurality of samples of training data into the machine learning model, each of the plurality of samples of training data being with a label;
calculating a loss function based on the set of output and the set of features; and
learning the machine learning model to reduce the loss function, wherein
the loss function is configured to include:
a main loss function configured to become smaller as the more output matches the label of training data;
a first loss function configured to become larger as first distances become smaller than a predetermined margin, wherein the first distances are distances in a feature space between features of a plurality of first anchor points selected out of the plurality of samples of training data with the label corresponding to the unknown class and features of one or more of samples of training data; and
a second loss function configured to become larger as second distances become larger and as third distances become smaller, wherein the second distances are distances in the feature space between features of a plurality of second anchor points selected out of the plurality of samples of training data with the label corresponding to any one of the known classes and features of one or more of samples of training data with a same label as the plurality of second anchor points, and
the third distances are distances in the feature space between the features of the plurality of second anchor points and features of one or more of samples of training data with a different label as the plurality of second anchor points.

A sixth disclosure is directed to a processing apparatus including the following features with respect to the processing apparatus according to the fifth disclosure.

the first loss function is represented by the following formula:

$$Ld = \frac{1}{|N|} \sum_{(x_a, x_n) \in N} \max(0, -d(f(x_a), f(x_n)) + \alpha)$$

$$N = \{(x_a, x_{ni}) | y_a \in \{u\}, y_{ni} \in C \cup \{u\}, d(f(x_a), f(x_{ni})) < \alpha\},$$

$$i = \{1, 2, \ldots, K\}$$

where:
Ld is the first loss function, $x_a$ is a first anchor point, $x_{ni}$ are samples of training data selected with the number of K for the first anchor point, N is a set of combinations of the plurality of first anchor points and the samples of training data, $y_a$ is the label of $x_a$, $y_{ni}$ is the label of $x_{ni}$, C is the set of the known classes, u is the unknown class, $\alpha$ is the predetermined margin, d(a, b) is a function measuring a distance in the feature space between a and b, and f(x) is the feature of x.

A seventh disclosure is directed to a processing apparatus including the following features with respect to the processing apparatus according to the sixth disclosure.
the second loss function is a triplet loss configured to be that the plurality of second anchor points is implemented as the anchor of the triplet loss and that the margin of the triplet loss is the predetermined margin of the first loss function.

An eighth disclosure is directed to a processing apparatus including the following features with respect to the processing apparatus according to the seventh disclosure.
the main loss function includes a domain generalization loss which learns the machine learning model to be able to classify the input data without depending on a domain of the input data.

A ninth disclosure is directed to One or more non-transitory computer readable media encoded with a computer program, the computer program comprising instructions that when executed by one or more computers cause the one or more computers to perform operations for learning a machine learning model classifying an input image into known classes and an unknown class by extracting a feature of the input image, each of the known classes showing that the input image falls into any one of specific categories and the unknown class showing that the input image does not fall into any of the specific categories.

The operations according to the ninth disclosure comprise:
acquiring a set of features by inputting a plurality of samples of training data into the machine learning model, each of the plurality of samples of training data being with a label;
calculating a loss function based on the set of features; and
learning the machine learning model to reduce the loss function, wherein
the loss function is configured to include:
a first loss function configured to become larger as first distances become smaller than a predetermined margin, wherein the first distances are distances in a feature space between features of a plurality of first anchor points selected out of the plurality of samples of training data with the label corresponding to the unknown class and features of one or more of samples of training data; and
a second loss function configured to become larger as second distances become larger and as third distances become smaller, wherein
the second distances are distances in the feature space between features of a plurality of second anchor points selected out of the plurality of samples of training data with the label corresponding to any one of the known classes and features of one or more of samples of training data with a same label as the plurality of second anchor points, and the third distances are distances in the feature space between the features of the plurality of second anchor points and features of one or more of samples of training data with a different label as the plurality of second anchor points.

According to the present disclosure, a loss function is calculated to include a first loss function and a second loss function. And a machine learning model is learned to reduce the loss function. It is thus possible to construct a feature space so as to distinguish between the unknown class and the known classes. Then, it is possible to generate a machine learning model capable of effectively solving OSDG.

EMBODIMENTS

Hereinafter, embodiments of the present disclosure will be described with reference to the accompanying drawings. Note that when the numerals of numbers, quantities, amounts, ranges, and the like of respective elements are mentioned in the embodiment shown as follows, the present disclosure is not limited to the mentioned numerals unless specially explicitly described otherwise, or unless the disclosure is explicitly specified by the numerals theoretically. Furthermore, configurations that are described in the embodiment shown as follows are not always indispensable to the disclosure unless specially explicitly shown otherwise, or unless the disclosure is explicitly specified by the structures or the steps theoretically. In addition, in the drawings, the same reference sign or numeral will be given to the same or equivalent component, and the repetitive description thereof will be appropriately simplified or omitted.

1. OSDG (OPEN SET DOMAIN GENERALIZATION)

A learning method according to the present embodiment is a method for learning a machine learning model which extracting a feature of an input image and classifying the input image based on the feature. In particular, the learning method relates to a machine learning model aimed at solving OSDG. The following will describe OSDG.

OSDG is problems in which open-set recognition and DG are combined. That is, the input image classified into known classes and an unknown class, each of the known classes showing that the input image falls into any one of specific categories (categories of interest) and the unknown class showing that the input image does not fall into any of the specific categories. And it is necessary that the classifying is performed regardless of a domain of the input image.

Figure 1:
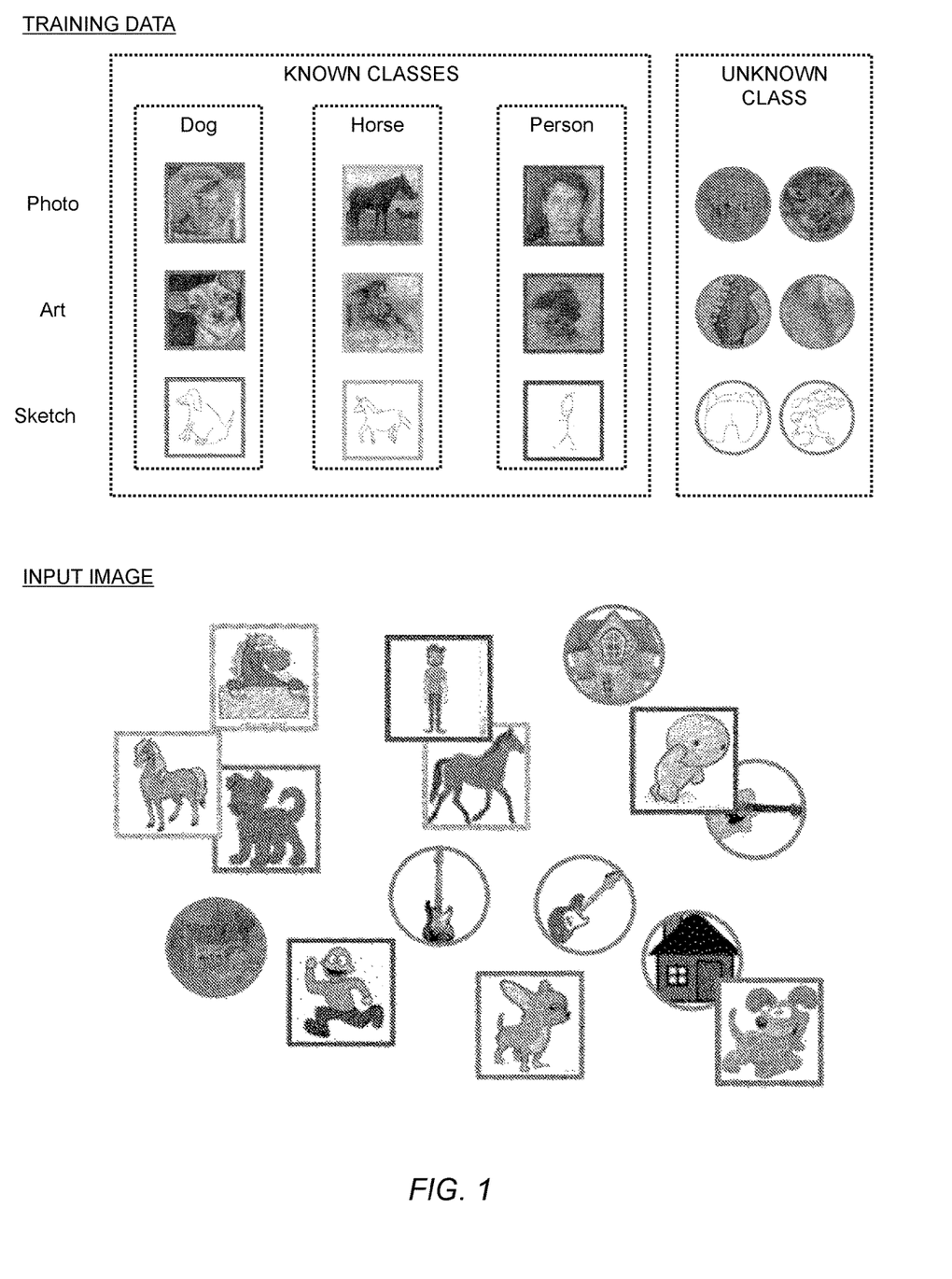
FIG. 1 is a conceptual diagram for explaining OSDG.

FIG. 1 is a conceptual diagram for explaining OSDG. In FIG. 1, a category indicates an object captured in image data. In FIG. 1, The known classes are configured of "Dog", "Horse", and "Person". And the unknown class shows that an object captured in image data is neither the "Dog", "Horse", and "Person". FIG. 1 illustrates a plurality of samples of image data having different domains ("Photo", "Art", "Sketch", etc.).

That is, in FIG. 1, OSDG is a problem of classifying an object captured in image data as the "Dog," "Horse," or "Person" and removing image data in which other objects are captured, without depending on the domain. For example, there is a case where a user desires to recognize (is interested in) that an input image captures a "Dog," "Horse," or "Person" but is not interested in other objects captured in the input data. Such a case can be cited as a practical problem, for example, when a case performing object recognition based on image data.

In a case generating a machine learning model for solving OSDG as illustrated in FIG. 1, learning is performed using, as a plurality of samples of training data, a plurality of samples of image data having different domains each other and each of which is with a label. Here, what is different from the conventional DG is that the classification includes the unknown class, and that the plurality of samples of training data may be with the label corresponding to the unknown class.

In OSDG, as like the conventional DG, the domain of the input image may not exist in the plurality of samples of training data. For example, in FIG. 1, as the training data, image data having the domain of "Photo" (first row), "Art" (second row), or "Sketch" (third row) is illustrated. On the other hand, as the input image, image data of a cartoon-like or deformed object is illustrated. Hereinafter, the domain of the training data is also referred to as a "source domain," and the domain of the input data is also referred to as a "target domain."

Generally, when classifying the input image, a feature of the input image is extracted, and the input image is classified based on the position of the extracted feature in a feature space. Most of the methods for the conventional DG align the feature space by using samples of training data in multiple source domains. The difficulty of OSDG is that, even if applying the method for the conventional DG to OSDG problems, the unknown class in the target domain is not guaranteed to be properly aligned because the unknown class in source and target domains is not necessarily in the conventional DG. Thus, the methods for the conventional DG have an issue that the feature of the input data of the unknown class may be mapped into the feature space of the known classes.

A method for OSDG requires at least two mechanisms. One (first mechanism) is constructing a separable feature space for rejecting image data of the unknown class. And the other (second mechanism) is matching distributions to align the known classes in multiple domains. The method for the conventional DG has the second mechanism, so it is possible to classify the input data without depending on the domain of the input data, but as described above the first mechanism is not sufficiently implemented in the method for the conventional DG.

The learning method according to the present embodiment has the first mechanism to effectively solve OSDG. And the method for the conventional DG can be employed for the second mechanism. It is thus possible to generate a machine learning model capable of effectively solving OSDG.

2. MACHINE LEARNING MODEL

Figure 2:
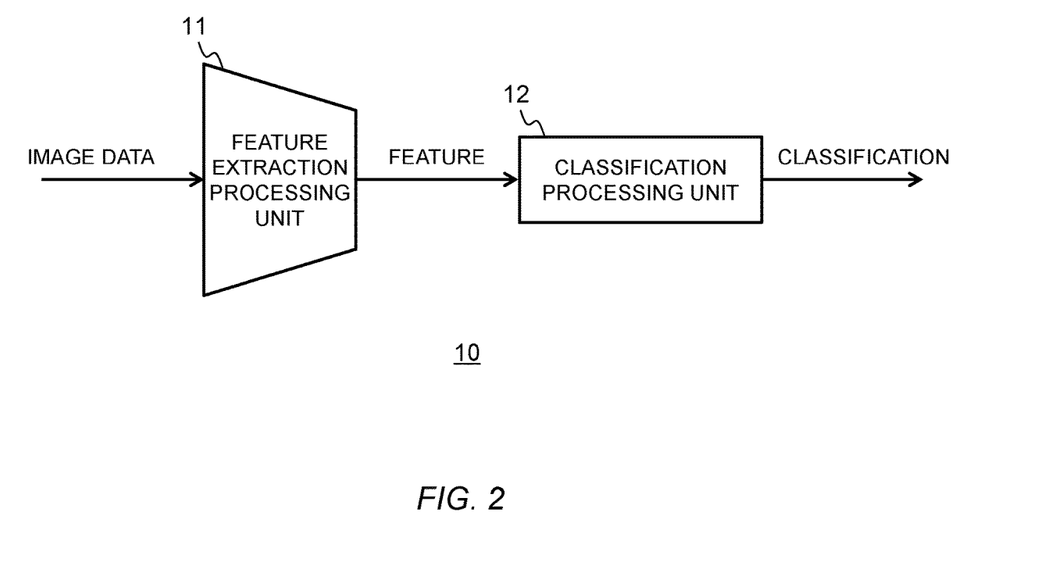
FIG. 2 is a block diagram illustrating a configuration example of a machine learning model in which learning is performed by a learning method according to an embodiment of the present disclosure.

The following will describe a machine learning model in which learning is performed by the learning method according to the present embodiment. FIG. 2 is a block diagram illustrating a configuration example of a machine learning model 10 in which learning is performed by the learning method according to the present embodiment.

The machine learning model 10 comprises a feature extraction processing unit 11 and a classification processing unit 12. The feature extraction processing unit 11 receives image data as an input and outputs a feature of the image data. The feature output by the feature extraction processing unit 11 is transmitted to the classification processing unit 12. The classification processing unit 12 receives the feature as an input and outputs a classification. That is, the machine learning model 10 classifies the image data.

The machine learning model 10 has parameters defining the processing for the feature extraction processing unit 11 and the processing for the classification processing unit 12, respectively. In other words, the learning in the machine learning model 10 is performed by updating the parameters.

The machine learning model 10 is typically implemented by a convolutional neural network. In this case, the feature extraction processing unit 11 is implemented by one or more convolution layers and one or more pooling layers, and the classification processing unit 12 is implemented by one or more affine layers. And the parameters are the weights of the filter of the convolution layer and the weights of the affine layer.

The machine learning model 10 may be implemented by other configurations. For example, while the feature extraction processing unit 11 is implemented by one or more convolution layers and one or more pooling layers, the classification processing unit 12 may be implemented by a support-vector machine (SVM) or a k-nearest neighbors algorithm (k-NN).

Typically, the machine learning model 10 is implemented by a computer program, and the processing of the machine learning model 10 is realized when instructions comprised in the computer program are executed by one or more computers. In this case, the parameters of the machine learning model 10 may be provided as a part of the computer program or may be stored into a memory and read by the one or more computers. Further, the parameters may be updated by updating the computer program or updating the memory.

3. LEARNING METHOD

The learning method according to the present embodiment calculates a loss function and learns the machine learning model 10 to reduce the loss function. The following will describe the learning method according to the present embodiment.

Figure 3:
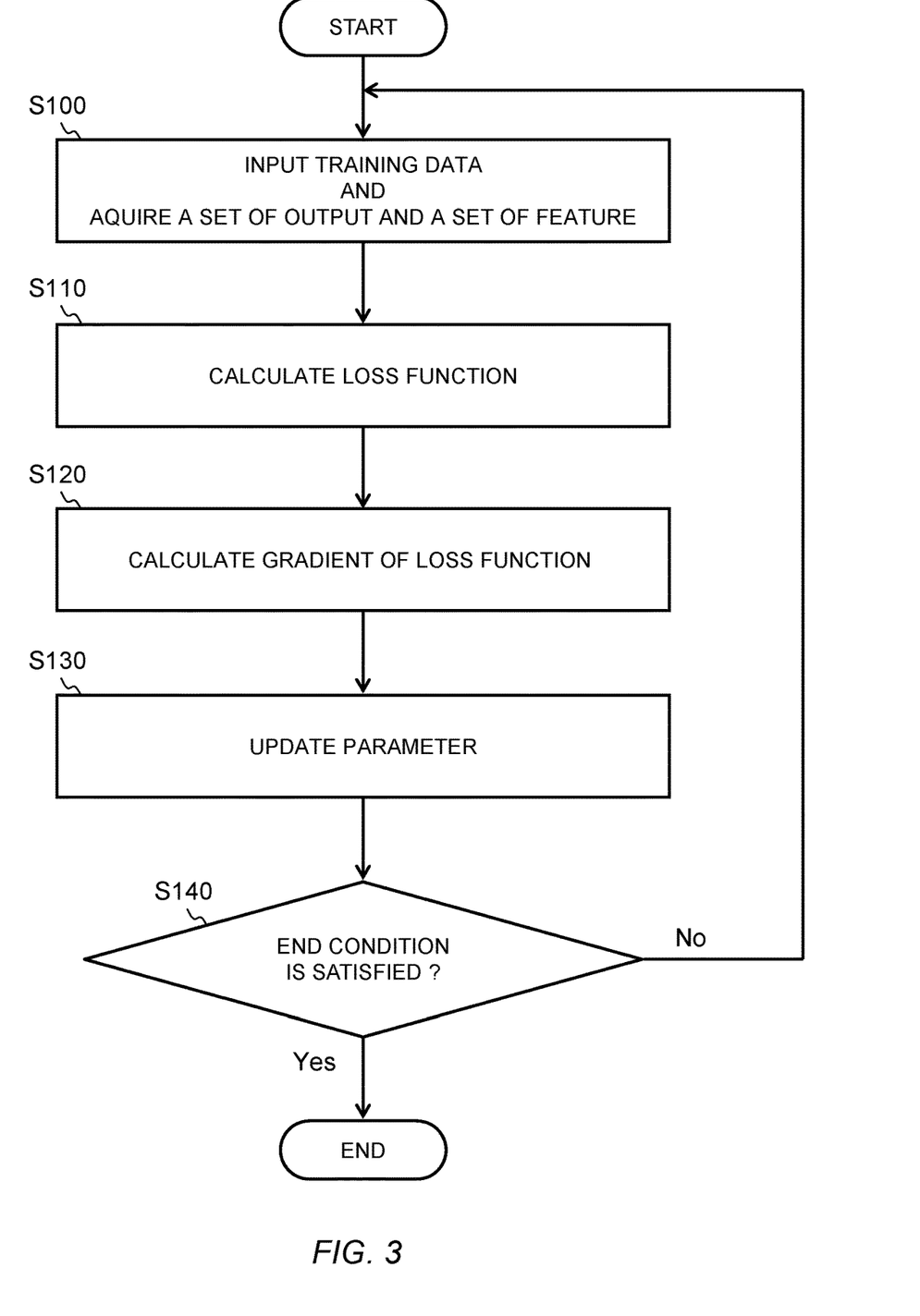
FIG. 3 is a flowchart illustrating the learning method according to an embodiment of the present disclosure.

FIG. 3 is a flowchart illustrating the learning method according to the present embodiment.

In Step S100, by inputting a plurality of samples of training data, a set of output of the machine learning model 10 and a set of features for the plurality of samples of training data are acquired. After Step S100, the processing proceeds to Step S110.

In Step S110, a loss function is calculated based on the set of output and the set of features acquired in Step S100. Here, in the learning method according to the present embodiment, the loss function calculated in Step S110 is characteristic to provide the first mechanism. Details of the loss function to be calculated in Step S110 will be described later. After Step S110, the processing proceeds to Step S120.

In Step S120, the gradient of the loss function acquired in Step S110 is calculated. In Step S120, any suitable known technique may be adopted as a method for calculating the gradient of the loss function. For example, when the machine learning model 10 is implemented by the convolutional neural network, the method for calculating the gradient of the loss function is typically backpropagation. After Step S120, the processing proceeds to Step S130.

In Step S130, the parameters of the machine learning model 10 are updated to reduce the loss function based on the gradient calculated in Step S120. That is, the parameters are updated by gradient descent. Here, hyperparameters related to the updating of the parameters may be suitably determined in accordance with an environment to which the learning method according to the present embodiment is applied. For example, the parameters may be updated by a momentum method.

In Step S140, it is determined whether or not an end condition is satisfied. The end condition is, for example, that the number of repetitions of the parameter update is equal to or greater than a predetermined value or that the loss function is equal to or less than a predetermined value.

When the end condition is satisfied (Yes in Step S140), the learning method ends. When the end condition is not satisfied (NO in Step S140), the processing returns to Step S100 again, and the learning method is repeated.

The learning method illustrated in FIG. 3 may be realized as operations performed by one or more computers when the one or more computers execute instructions comprised in a computer program. And one or more non-transitory computer readable media encoded with the computer program may be provided for the one or more computers to execute the instructions.

4. LOSS FUNCTION

The inventors of the present disclosure have obtained the idea of employing a method of metric learning for constructing the feature space with the first mechanism. The typical loss functions for metric learning (e.g., triplet loss and contrastive loss) encourages samples with the same class to move closer to each other, and samples with different classes to be further away in the feature space. Thus, it can be expected to construct the feature space that is easily separable by class.

However, it is not obvious how to utilize samples of the unknown class for the typical loss functions for metric learning. The only thing we can say about the samples of the unknown class is that, when employing the triplet loss, the samples of the unknown class do not constitute positive pairs with the samples of the known classes. And we cannot naively determine the positive pairs including the samples of the unknown class.

A straightforward approach to exploit the samples of the unknown class is to use them only for forming negative pairs in the triplet loss. However, the inventors of the present disclosure found in an ablation study that this approach alone is not enough for OSDG because it does not explicitly move away the samples of the unknown class in the feature space.

Figure 4:
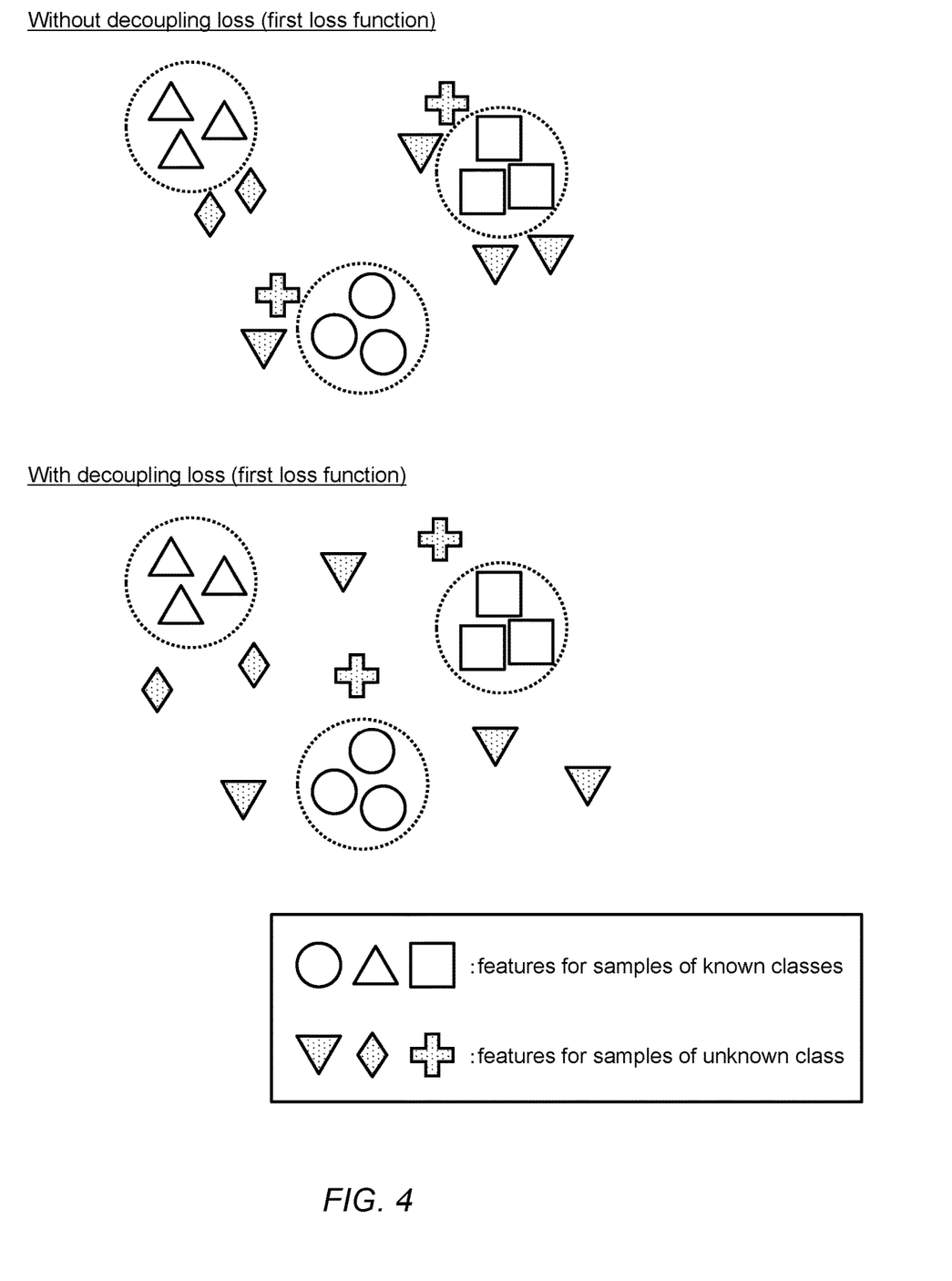
FIG. 4 is a conceptual diagram presenting a feature space achieved by a first loss function.

Motivated by the above discussion, in addition to the above approach, the inventors of the present disclosure have obtained the idea of introducing a decoupling loss (first loss function) which keep the distance among the samples of the unknown class in the feature space. FIG. 4 is a conceptual diagram representing the feature space achieved by the first loss function. Each plane figure illustrated in FIG. 4 shows a feature in the feature space. It is shown here that the same plane figures are of the same class. The dotted line illustrated in FIG. 4 shows an example of a desirable discrimination boundary for OSDG.

As illustrated in FIG. 4, both with and without the first loss function, it is possible to construct the feature space in which the features for the samples of the same known classes are closer to each other by metric learning. However, when the first loss function is not introduced, the features for the samples of the unknown class are hardly separated from the features for the samples of the known classes (see figure above). On the other hand, by introducing the first loss function, the features of samples of the unknown class are sufficiently far form the features of the samples of the known classes, and the samples of the unknown class are discriminated more accurately (see figure below).

The following will describe in detail the loss function calculated in the learning method according to the present embodiment.

In the learning method according to the present embodiment, the loss function is calculated to include the decoupling loss (first loss function) and a triplet loss (second loss function).

First, the first loss function will be described. The first loss function is represented by Ld of the following Formula. 1.

$$Ld = \frac{1}{|N|} \sum_{(x_a, x_n) \in N} \max(0, -d(f(x_a), f(x_n)) + \alpha) \quad \text{[Formula. 1]}$$

$$N = \{(x_a, x_{ni}) | y_a \in \{u\}, y_{ni} \in C \cup \{u\}, d(f(x_a), f(x_{ni})) < \alpha\}$$

$$i = \{1, 2, \ldots, K\}$$

Where x* is a sample of training data, y* is the label of x*, C is the set of the known classes, u is the unknown class, f(x*) is the feature of x*, and d(a, b) is a function measuring the distance in the feature space between a and b.

That is, $x_a$ is a sample of training data with the label corresponding to the unknown class (hereinafter also referred to as "first anchor point"), $x_{ni}$ (i={1, 2, . . . , K}) are samples of training data selected with the number of K for the first anchor point. Therefore, N is a set of combinations of a plurality of first anchor points and the samples of training data. Here, in Formula.1, $x_{ni}$ (i={1, 2, . . . , K}) are selected on the condition that the distance to the corresponding first anchor point is less than a predetermined margin α. This condition is for preventing the selection of samples of training data that has already achieve the purpose of the first loss function and does not contribute to a change in the first loss function. It is thereby possible to improve the efficiency of the processing of learning.

Here, "i" is an additional number for distinguishing each of the samples of training data selected for the first anchor point. And the predetermined margin α defines how far the unknown class is to be kept in the feature space. The predetermined margin α may be suitably given in accordance with the environment to which the learning method according to the present embodiment is applied.

In the configuration of N, the plurality of first anchor points is selected out of the plurality of samples of training data with the label corresponding to the unknown class, and $x_{ni}$ are selected with the number of K for each of the plurality of first anchor points. And in Formula. 1, |N| represents the element number of N.

In Formula. 1, a suitable function may be implemented as d depending on the environment to which the learning method according to the present embodiment is applied. For example, the cosine similarity is implemented as d.

Figure 5:
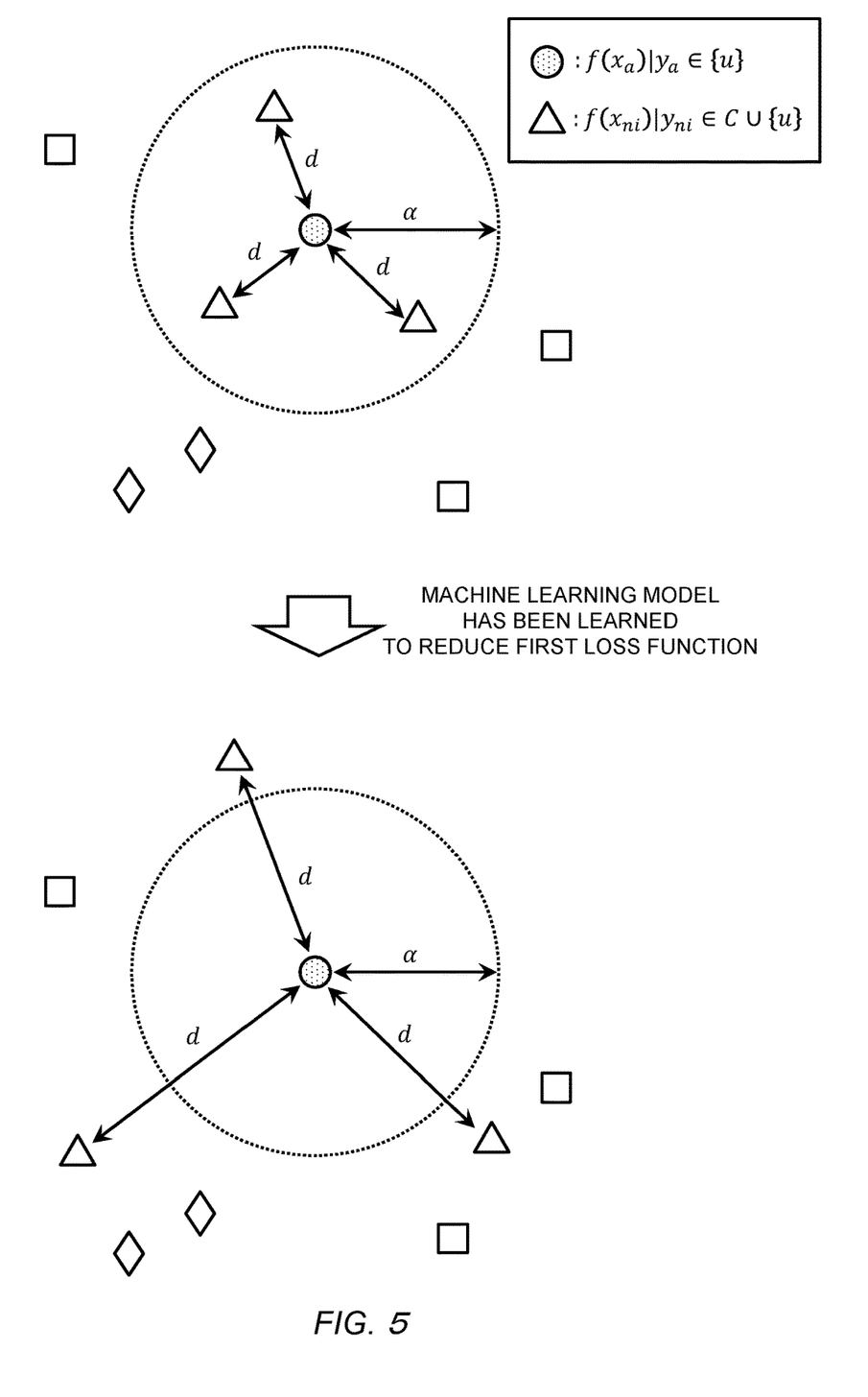
FIG. 5 is a conceptual diagram showing the feature space when learning the machine learning model to reduce the first loss function.

As shown in Formula. 1, when calculating the first loss function, distances in the feature space (hereinafter also referred to as "first distances") between features of the plurality of first anchor points and features of $x_{ni}$ are calculated. And the first loss function becomes larger as the first distances become smaller than the predetermined margin. That is, by learning the machine learning model 10 (updating the parameters of the machine learning model 10) to reduce the first loss function, it is possible to construct the feature space maintaining the distances among the samples of the unknown class. FIG. 5 illustrates a conceptual diagram showing the feature space when learning the machine learning model 10 to reduce the first loss function.

Next, the second loss function will be described. The second loss function is represented by Lt of the following Formula. 2.

$$Lt = \quad \text{[Formula. 2]}$$

$$\frac{1}{|T|} \sum_{(x_a, x_p, x_n) \in T} \max(0, d(f(x_a), f(x_p)) - d(f(x_a), f(x_n)) + \alpha)$$

$$T = \{(x_a, x_p, x_{ni}) | y_a = y_p \in C,$$

$$y_{ni} \in C \cup \{u\}, y_a \neq y_{ni}, d(f(x_a), f(x_p)) < d(f(x_a), f(x_{ni})) + \alpha\}$$

$$i = \{1, 2, \ldots, K\}$$

As shown in Formula. 2, the second loss function is a triplet loss configured to be that a plurality of samples (hereinafter also referred to as "plurality of second anchor points") selected out of the plurality of samples of training data with the label corresponding to any one of the known classes is implemented as the anchor of the triplet loss, and that the margin of the triplet loss is the same margin α as the predetermined margin of the first loss function. That is, in Formula. 2, $x_a$ is a second anchor point, $x_p$ is a positive pair of $x_a$ (a sample of training data with the same label as $x_a$), $x_{ni}$ (i={1, 2, . . . , K}) are negative pairs of $x_a$ (samples of training data with a different label as $x_a$) which selected with the number of K, and T is a set of triplets.

In the configuration of T, $x_p$ may be one or more of samples of training data selected randomly out of the plurality of samples of training data with the same label as $x_a$. It is thus possible to execute learning without selecting as positive pairs all samples of training data with the same label of $x_a$, then it is possible to improve the efficiency of the processing of learning.

Furthermore, $x_{ni}$ (i={1, 2, ..., K}) are selected with the number of K for each of the plurality of first anchor points. Incidentally, although the set of triplets shown in Formula. 2 is configured to select negative pairs by semi-hard, the selection may be modified (e.g., select negative pairs by hard). And the number of samples may not equal to that of the first loss function.

As shown in Formula. 2, when calculating the second loss function, distances in the feature space (hereinafter also referred to as "second distances") between features of the plurality of second anchor points and features of $x_p$ are calculated. And distances in the feature space (hereinafter also referred to as "third distances") between features of the plurality of second anchor points and features of $x_{ni}$ are calculated. Then, the second loss function becomes larger as the second distances become larger and the third distances become smaller. In other words, the second loss function becomes larger as the distances between features of $x_a$ and $x_p$ are larger and as the distances between features of $x_a$ and $x_{ni}$ are smaller. Note that, in Formula. 2, it is characteristic that the plurality of anchor points is selected out of the plurality of samples of training data with the label corresponding to the known classes.

Figure 6:
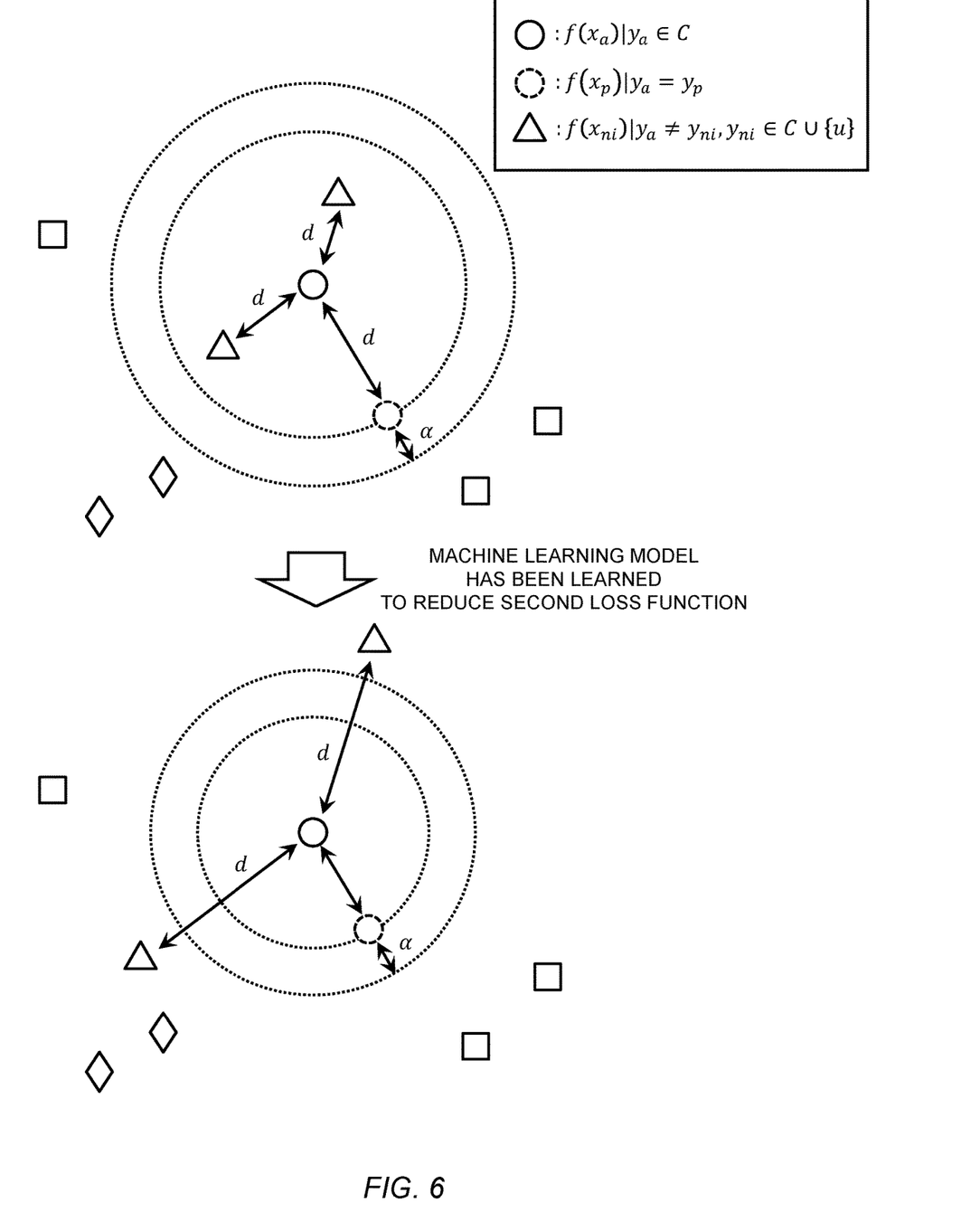
FIG. 6 is a conceptual diagram showing the feature space when learning the machine learning model to reduce a second loss function.

That is, by learning the machine learning model 10 to reduce the second loss function, it is possible to satisfy the following Formula. 3. Formula. 3 means each of the plurality of second anchor points should be relatively closer to the positive pairs than the negative pairs. Therefore, it is possible to construct the feature space in which, regarding samples of the known classes, samples of the same class move closer to each other and samples of different class move further away. FIG. 6 illustrates a conceptual diagram showing the feature space when learning the machine learning model 10 to reduce the second loss function.

$$d(f(x_a),f(x_p))+\alpha \leq d(f(x_a),f(x_{ni}))$$ [Formula. 3]

Note that, when learning the machine learning model 10 to just reduce the second loss function, regarding samples of unknown class, the feature space is just constructed to be that samples of the unknown class move away from samples of the known classes. Thus, learning the machine learning model 10 to reduce the second loss function alone, it will just construct the feature space as shown in the above of FIG. 4. Therefore, by introducing the first loss function, it is possible to construct the feature map maintaining the distances among samples of the unknown class as shown in FIG. 5. In this way, it is possible to construct the feature space as shown in the bellow of FIG. 4.

As described above, the first mechanism is implemented by calculating the loss function configured to include the first loss function and the second loss function. And the conventional DG is combined in order to implement the second mechanism. That is, in the learning method according to the present embodiment, the loss function is configured as represented by L of the following Formula. 4.

$$L = L_{DG} + \lambda * Lm$$

$$Lm = Ld + Lt$$ [Formula. 4]

Where, $L_{DG}$ is a domain generalization loss related to the conventional DG. That is, by learning the machine learning model 10 to reduce $L_{DG}$, it is possible to generate the machine learning model 10 being able to classify the input data without depending on the domain of the input data. The configuration of $L_{DG}$ is defined according to the employed method for the conventional DG. Here, as the method for the conventional DG, a suitable method (e.g., DeepAll, JiGen, MMLD) may be employed in accordance with the environment to which the learning method according to the present embodiment is adopted. Since $L_{DG}$ is the loss for learning the machine learning model 10 to classify image data on DG, $L_{DG}$ has the configuration of a loss (main loss function) which become smaller as the more output matches the label of training data.

In Formula. 4, $\lambda$ is a positive real number and is a hyperparameter that gives the degree of contribution of each of the first loss function and the second loss functions. $\lambda$ may be suitably defined in accordance with the environment to which the learning method according to the present embodiment is applied.

5. EXPERIMENTS

Figure 7:
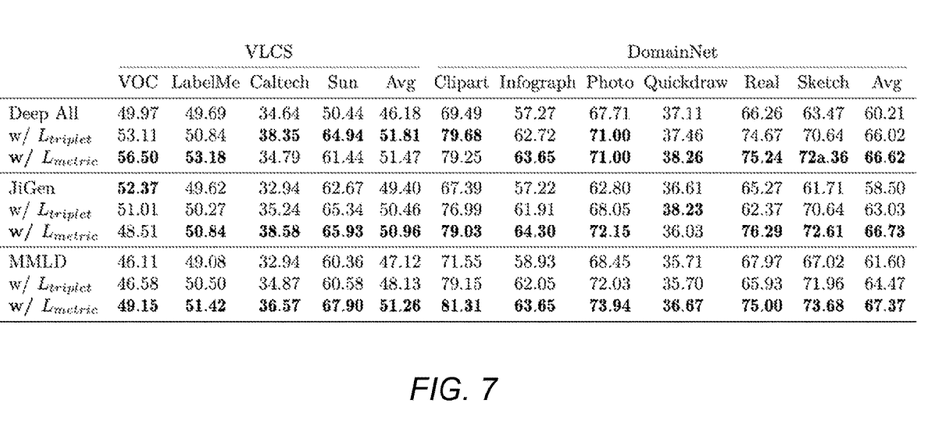
FIG. 7 is a table of the result of experiments conducted on two DG benchmark datasets.

The inventors of the present disclosure conduct experiments on two DG benchmark datasets: VLCS and DomainNet. FIG. 7 shows a table of the result of the experiments. In FIG. 7, each value represents a classification accuracy (%).

Figure 8:
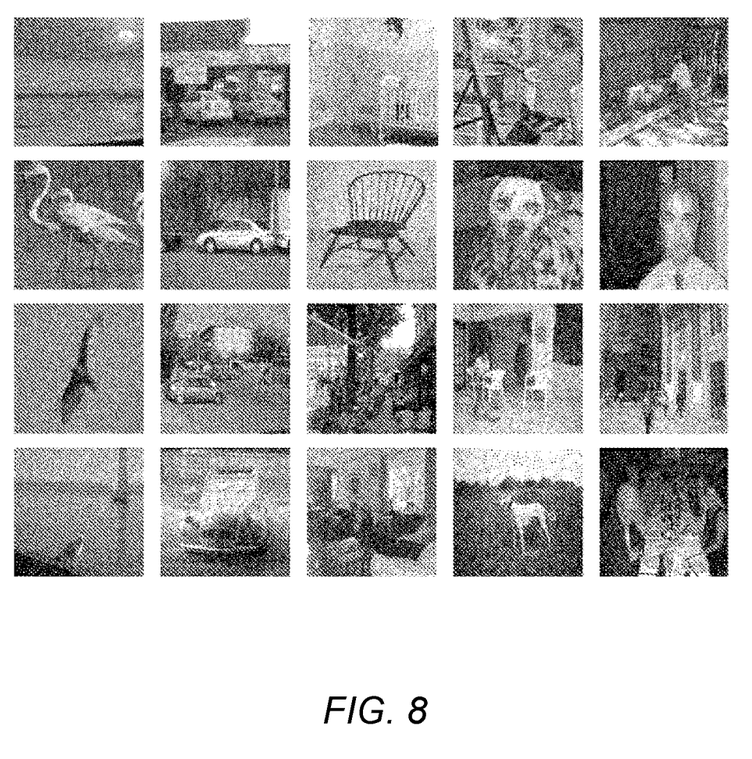
FIG. 8 illustrates examples of image data of one of the DG benchmark datasets.
Figure 9:
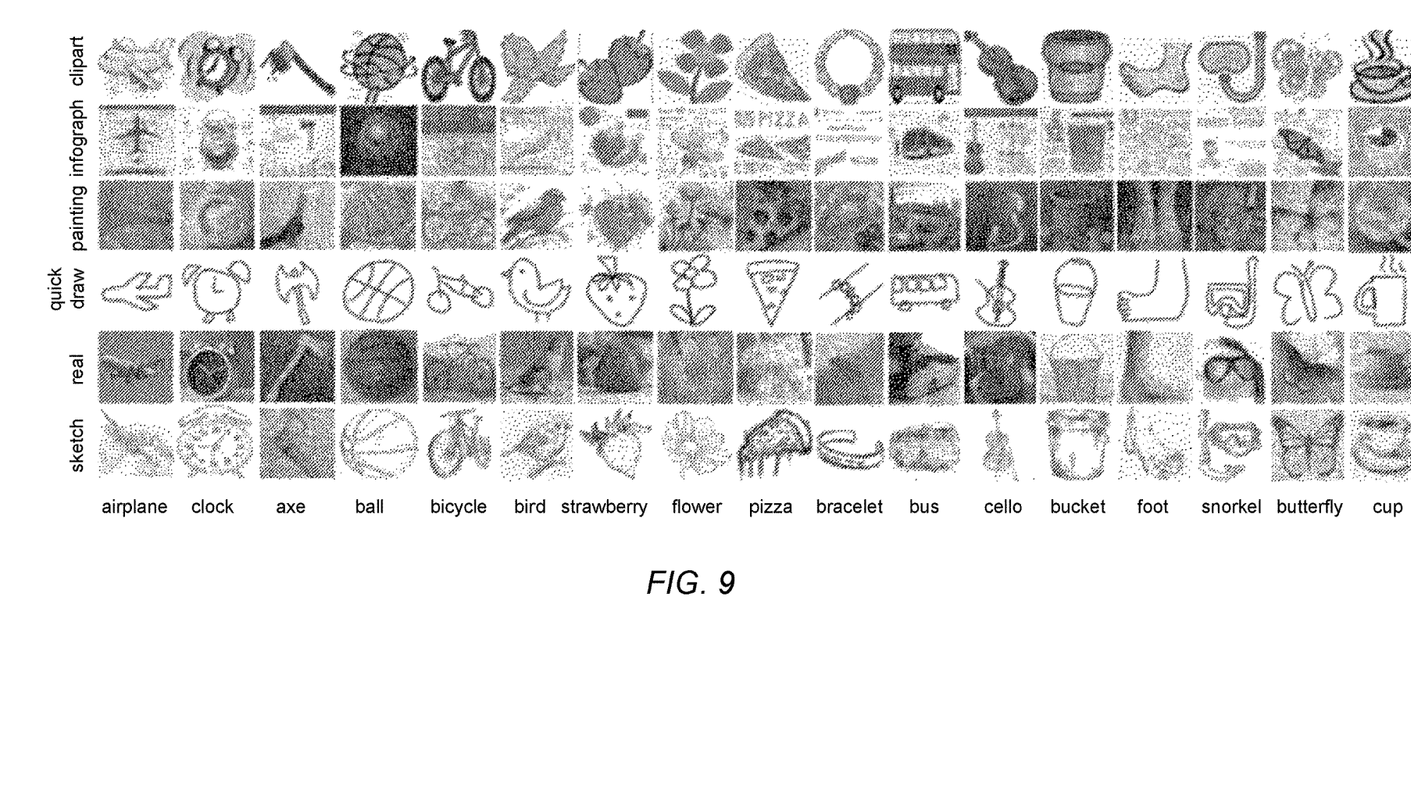
FIG. 9 illustrates examples of image data of one of the DG benchmark datasets.

Here, VLCS combines four different datasets (i.e., PASCAL VOC 2007, LabelMe, Caltech-101, Sun09) and consists of five object categories. DomainNet includes 345 object categories from six domains (i.e., sketch, real, quickdraw, painting, infograph, and clipart). FIG. 8 and FIG. 9 illustrate examples of image data of VLCS and DomainNet.

In the experiments, to set problems as OSDG, all classes are split into three subset: Ck, Csu, and Cuu. Ck is a set of the known classes in both the source domain and the target domain, Csu is a set of the unknown class in the source domain, and the Cuu is a set of the unknown class in the target domain. Ck, Csu, and Cuu are unique to each other.

In experiments on VLCS, samples of image data of |Ck|=3, |Csu|=1, and |Cuu|=1 are used. And in experiments on DomainNet, samples of image data of |Ck|=10, |Csu|=167, and |Cuu|=168 are used. Concretely on VLCS, classes of car, chair, and person are the known classes of the source domain, class of dog is the unknown class of the source domain, and class of bird is the unknown class of the target domain. And on DomainNet, the Csu and Cuu contain up to 2,000 samples to balance with the other classes.

As for baselines (i.e., $L_{DG}$ only), the inventors of the present disclosure use three DG methods as shown in FIG. 7: Deep All, JiGen, and MMLD. And the table shown in FIG. 7 shows comparisons between three experiments, a case (first stage, $L_{DG}$ only) where the learning method according to the present embodiment is not applied, a case (second stage, w/$L_{triplet}$ ($L_{DG}+\lambda*Lt$)) where the second loss function is applied, and a case (third stage, w/$L_{metric}$ ($L_{DG}+\lambda*Lm$)) where the first loss function and the second loss function are applied.

As can be seen in the table shown in FIG. 7, by applying the learning method according to the present embodiment, it is possible to improve the classification accuracy. In particular, the application of the second loss function improves the classification accuracy in all the cases. Furthermore, the application of the first loss function and the second loss function is more totally effective in improving the classification accuracy than the application of the second loss function alone. As described above, by applying the learning method according to the present embodiment, it is possible to generate the machine learning model 10 which can effectively solve OSDG.

6. PROCESSING APPARATUS

Figure 10:
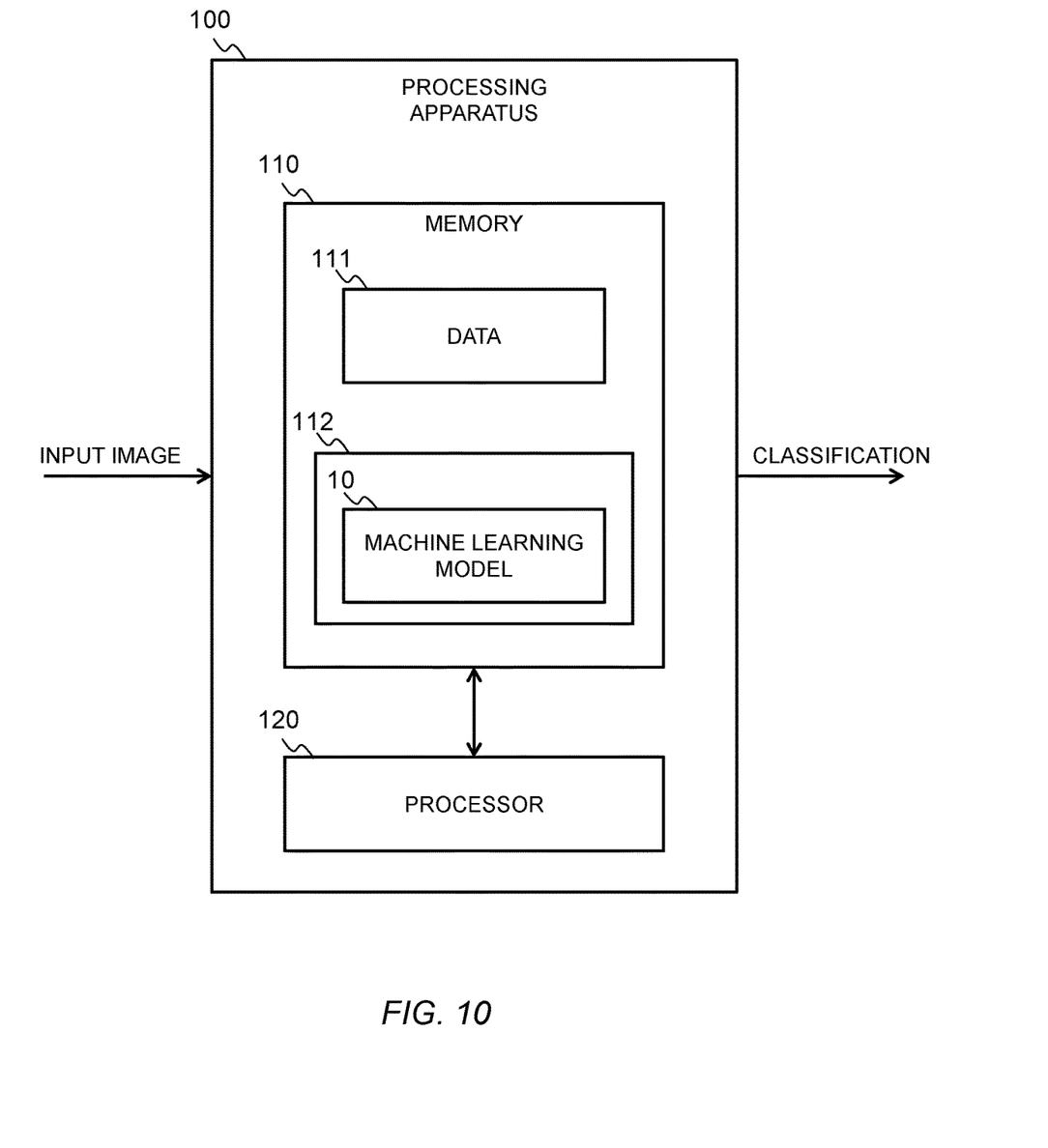
FIG. 10 is a block diagram illustrating a configuration example of a processing apparatus according to an embodiment of the present disclosure.

It is possible to configure a processing apparatus classifying the input image into the known classes and the unknown class based on the feature of the input image by using the machine learning model 10. Furthermore, by using the machine learning model 10 which has been learned by the learning method according to the present embodiment, it is possible to configure the processing apparatus being capable of effectively solving OSDG. The following will describe the processing apparatus according to the present embodiment. FIG. 10 illustrates a configuration example of the processing apparatus 100.

The processing apparatus 100 receives the input image and outputs the classification of the input image. The processing apparatus 100 comprises a memory 110 and a processor 120. The processing apparatus 100 may be one or more computers. For example, the processing apparatus is a server (may be a virtual server) configured on a communication network (e.g., the Internet).

The memory 110 stores data 111 and a computer program 112. The computer program 112 comprises executable instructions that, when executed by the processor 120, cause the processing apparatus 100 to perform operations. That is, the processor 120 read the data 111 and the computer program 112 from the memory 110 and executes the instructions based on the data 111.

Here, the machine learning model 10 which has been learned by the learning method according to the present embodiment is implemented by the computer program 112. Therefore, the feature extraction processing unit 11 and the classification processing unit 12 are realized by the processor 120 executing the instructions of the computer program 112. At this time, the learned parameters of the machine learning model 10 may be stored as the data 111 or may be stored as a part of the computer program 112.

The processor 120 reads the computer program 112 related to the machine learning model 10 and executes the instructions of the computer program 112 related to the machine learning model 10, thereby realizing the processing apparatus 100 capable of effectively solving OSDG.

7. MODIFICATION

The learning method according to the present embodiment can also be applied to a case where the learning is performed only on the feature extraction processing unit 11 in the machine learning model 10. For example, this is the case where learning is performed only on the feature extraction processing unit 11 of the machine learning model 10 which has been learned by the method for the conventional DG.

In this case, the output of the part of the machine learning model 10 subject to learning is the feature of image data. And the loss function calculated in the learning method according to the present embodiment is configured to include the first loss function and the second loss function.

Accordingly, providing the feature extraction processing unit 11 having learned by the learning method according to the present embodiment as DG makes it possible to generate the machine learning model 10 capable of effectively solving OSDG. Furthermore, the classification processing unit 12 may be configured of SVM or k-NN and combined with the feature extraction processing unit 11 having learned by the learning method according to the present embodiment to generate the machine learning model 10.

What is claimed is:

1. A method performed by one or more computers for learning a machine learning model classifying an input image into known classes and an unknown class by extracting a feature of the input image, each of the known classes showing that the input image falls into any one of specific categories and the unknown class showing that the input image does not fall into any of the specific categories, the method comprising:
acquiring a set of features by inputting a plurality of samples of training data into the machine learning model, each of the plurality of samples of training data being with a label;
calculating a loss function based on the set of features; and
learning the machine learning model to reduce the loss function, wherein
the loss function is configured to include:
a first loss function configured to become larger as first distances become smaller than a predetermined margin, wherein the first distances are distances in a feature space between features of a plurality of first anchor points selected out of the plurality of samples of training data with the label corresponding to the unknown class and features of one or more of samples of training data; and
a second loss function configured to become larger as second distances become larger and as third distances become smaller, wherein
the second distances are distances in the feature space between features of a plurality of second anchor points selected out of the plurality of samples of training data with the label corresponding to any one of the known classes and features of one or more of samples of training data with a same label as the plurality of second anchor points, and
the third distances are distances in the feature space between the features of the plurality of second anchor points and features of one or more of samples of training data with a different label as the plurality of second anchor points.

2. The method according to claim 1, wherein
the first loss function is represented by the following formula:

$$Ld = \frac{1}{|N|} \sum_{(x_a, x_n) \in N} \max(0, -d(f(x_a), f(x_n)) + \alpha)$$

$$N = \{(x_a, x_{ni}) | y_a \in \{u\}, y_{ni} \in C \cup \{u\}, d(f(x_a), f(x_{ni})) < \alpha\},$$

$$i = \{1, 2, \ldots, K\}$$

where:
Ld is the first loss function, $x_a$ is a first anchor point, $x_{ni}$ are samples of training data selected with the number of K for the first anchor point, N is a set of combinations of the plurality of first anchor points and the samples of training data, $y_a$ is the label of $x_a$, $y_{ni}$ is the label of $x_{ni}$, C is the set of the known classes, u is the unknown class, $\alpha$ is the predetermined margin, d(a, b) is a function measuring a distance in the feature space between a and b, and f(x) is the feature of x.

3. The method according to claim 2, wherein
the second loss function is a triplet loss configured to be that the plurality of second anchor points is implemented as the anchor of the triplet loss and that the margin of the triplet loss is the predetermined margin of the first loss function.

4. A processing apparatus configured to execute classifying an input image into known classes and an unknown class based on a feature of the input image by using a machine learning model, each of the known classes showing that the input image falls into any one of specific categories and the unknown class showing that the input image does not fall into any of the specific categories;
wherein
the machine learning model has been learned by a method comprising:
acquiring a set of output and a set of features by inputting a plurality of samples of training data into the machine learning model, each of the plurality of samples of training data being with a label;
calculating a loss function based on the set of output and the set of features; and
learning the machine learning model to reduce the loss function, wherein
the loss function is configured to include:
a main loss function configured to become smaller as the more output matches the label of training data;
a first loss function configured to become larger as first distances become smaller than a predetermined margin, wherein the first distances are distances in a feature space between features of a plurality of first anchor points selected out of the plurality of samples of training data with the label corresponding to the unknown class and features of one or more of samples of training data; and
a second loss function configured to become larger as second distances become larger and as third distances become smaller, wherein
the second distances are distances in the feature space between features of a plurality of second anchor points selected out of the plurality of samples of training data with the label corresponding to any one of the known classes and features of one or more of samples of training data with a same label as the plurality of second anchor points, and
the third distances are distances in the feature space between the features of the plurality of second anchor points and features of one or more of samples of training data with a different label as the plurality of second anchor points.

5. The processing apparatus according to claim 4, wherein the first loss function is represented by the following formula:

$$Ld = \frac{1}{|N|} \sum_{(x_a, x_n) \in N} \max(0, -d(f(x_a), f(x_n)) + \alpha)$$

$$N = \{(x_a, x_{ni}) | y_a \in \{u\}, y_{ni} \in C \cup \{u\}, d(f(x_a), f(x_{ni})) < \alpha\},$$

$$i = \{1, 2, \ldots, K\}$$

where:
Ld is the first loss function, $x_a$ is a first anchor point, $x_{ni}$ are samples of training data selected with the number of K for the first anchor point, N is a set of combinations of the plurality of first anchor points and the samples of training data, $y_a$ is the label of $x_a$, $y_{ni}$ is the label of $x_{ni}$, C is the set of the known classes, u is the unknown class, $\alpha$ is the predetermined margin, d(a, b) is a function measuring a distance in the feature space between a and b, and f(x) is the feature of x.

6. The processing apparatus according to claim 5, wherein the second loss function is a triplet loss configured to be that the plurality of second anchor points is implemented as the anchor of the triplet loss and that the margin of the triplet loss is the predetermined margin of the first loss function.

7. The processing apparatus according to claim 6, wherein the main loss function is a domain generalization loss which learns the machine learning model to be able to classify the input data without depending on a domain of the input data.

8. One or more non-transitory computer readable media encoded with a computer program, the computer program comprising instructions that when executed by one or more computers cause the one or more computers to perform operations for learning a machine learning model classifying an input image into known classes and an unknown class by extracting a feature of the input image, each of the known classes showing that the input image falls into any one of specific categories and the unknown class showing that the input image does not fall into any of the specific categories, the operations comprising:
acquiring a set of features by inputting a plurality of samples of training data into the machine learning model, each of the plurality of samples of training data being with a label;
calculating a loss function based on the set of features; and
learning the machine learning model to reduce the loss function, wherein
the loss function is configured to include:
a first loss function configured to become larger as first distances become smaller than a predetermined margin, wherein the first distances are distances in a feature space between features of a plurality of first anchor points selected out of the plurality of samples of training data with the label corresponding to the unknown class and features of one or more of samples of training data; and
a second loss function configured to become larger as second distances become larger and as third distances become smaller, wherein
the second distances are distances in the feature space between features of a plurality of second anchor points selected out of the plurality of samples of training data with the label corresponding to any one of the known classes and features of one or more of samples of training data with a same label as the plurality of second anchor points, and
the third distances are distances in the feature space between the features of the plurality of second anchor points and features of one or more of samples of training data with a different label as the plurality of second anchor points.

* * * * *